United States Patent
Flores

(10) Patent No.: US 6,813,765 B1
(45) Date of Patent: Nov. 2, 2004

(54) BINDING USING ABSOLUTE MEMORY REFERENCES

(75) Inventor: Roger Flores, Redwood City, CA (US)

(73) Assignee: Palm Source, Inc., Sunnyvale, CA (US)

(*) Notice: Subject to any disclaimer, the term of this patent is extended or adjusted under 35 U.S.C. 154(b) by 0 days.

(21) Appl. No.: 09/573,072

(22) Filed: May 16, 2000

(51) Int. Cl.$^7$ .......................... G06F 9/445; G06F 9/44; G06F 9/46
(52) U.S. Cl. ................. 717/174; 717/168; 719/331
(58) Field of Search ................... 717/136, 156, 717/151, 174, 159, 168; 711/103, 115; 707/10; 455/556.2; 463/29; 705/14; 719/331

(56) References Cited

U.S. PATENT DOCUMENTS

| | | | | | |
|---|---|---|---|---|---|
| 5,313,596 A | * | 5/1994 | Swindler et al. | ............ | 710/303 |
| 5,497,479 A | * | 3/1996 | Hornbuckle | ................. | 463/29 |
| 5,860,157 A | * | 1/1999 | Cobb | ......................... | 711/103 |
| 5,925,127 A | * | 7/1999 | Ahmad | ....................... | 713/200 |
| 5,966,539 A | * | 10/1999 | Srivastava | .................. | 717/156 |
| 6,098,059 A | * | 8/2000 | Nordin | ........................ | 706/13 |
| 6,216,112 B1 | * | 4/2001 | Fuller et al. | .................. | 705/14 |
| 6,356,905 B1 | * | 3/2002 | Gershman et al. | ............ | 707/10 |
| 6,418,454 B1 | * | 7/2002 | Toohey | ........................ | 707/201 |
| 6,467,084 B1 | * | 10/2002 | Howard et al. | ............. | 717/136 |
| 6,542,167 B1 | * | 4/2003 | Darlet et al. | ................. | 345/762 |
| 6,542,854 B2 | * | 4/2003 | Yang et al. | .................. | 702/186 |
| 6,601,139 B1 | * | 7/2003 | Suzuki | ........................ | 711/115 |

\* cited by examiner

*Primary Examiner*—Kakali Chaki
*Assistant Examiner*—Trenton J Roche
(74) *Attorney, Agent, or Firm*—Wagner, Murabito & Hao LLP

(57) ABSTRACT

A method and system for implementing an application on a computer system, in particular a portable computer system, by binding an interface (e.g., a function call and required address translations) in the application to a specific memory address. The application is installed on the computer system with a reference to a section of computer code. The reference is for transferring execution of the application to that section of computer code. After a specified criterion is satisfied, the reference is replaced with a specific memory address of the computer system's memory map, such as a line number, thus binding the application to that memory address for that function call. Accordingly, when the application makes a call to that function, the execution of the application can proceed directly to the line number where that function is located.

16 Claims, 13 Drawing Sheets

BINDING USING ABSOLUTE MEMORY REFERENCES

BACKGROUND OF THE INVENTION

1. Field of the Invention

The present invention relates to the field of data processing systems. specifically, the present invention relates to a method and system for binding an application to a memory address in a portable computer system.

2. Related Art

As the components required to build a computer system have reduced in size, new categories of computer systems have emerged. One of the more recent categories of computer systems is the "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

The portability and convenience of palmtops has made it increasingly desirable to increase the number and types of applications that can be run on them. It is advantageous to expand the capabilities of a palmtop so that it can provide many of the same, if not the same, services provided by a desktop or laptop computer system, particularly with regard to access to the World Wide Web as well as the ability to communicate with other palmtops and personal computers. As such, information currently available via the Internet over personal computers, such as on-line access to news and financial information, can also be provided via a palmtop. In addition, a palmtop can be used for electronic mail ("e-mail") and multi-player gaming, and features such as voice recognition can also be added.

It has proven convenient to exchange applications between a computer system and a palmtop computer using a communication interface, such as a serial or parallel input port. Many palmtop computers also include an infrared communication port for transmitting data over a wireless link. Thus, mechanisms exist for transferring applications or other information from a computer system to a palmtop, or from one palmtop to another. Moreover, the palmtop can be linked to traditional desktop applications such as word processing and spreadsheet programs.

Many applications today utilize the well-known Component Object Model (COM) software architecture as well as other well-known architectures such as Common Object Request Broker Architecture (CORBA), Distributed COM (DCOM), and Distributed Computing Environment (DCE). COM is based on software objects or modules that are well encapsulated and accessed through interfaces (e.g., function calls) provided by services such as Object Linking and Embedding (OLE) and ActiveX. COM objects can interoperate with other COM components through their interfaces. In this way, COM allows applications to be built from different components.

The traditional model for generic, limited resource devices such as palmtops is that a memory image providing a certain set of abstract operating system services is built and installed on the device. With a COM-based architecture and other similar architectures, the operating system provides services supporting the execution of an application, in essence implementing interfaces (e.g., function calls) between various software components and modules when the application is called. A function call in essence works by transferring the execution of an application to another section of code that performs the function. After the function is performed, execution is transferred back to the application at the point where the function call was made.

When compared to a desktop computer system, a limitation associated with palmtops is that, with portability and convenience, there is a tradeoff in processing power and memory space. Innovative techniques may be available to store data and information more densely in smaller places. The processing issue can be addressed in part using processors that are smaller and faster than preceding generations. Still, for a given processor speed, it is desirable to develop methods and systems for improving the speed at which applications can be executed.

However, processing speed and hence the speed at which an application can be executed are slowed by having to implement the interfaces (e.g., function calls and required address translations) between the various applications and software component objects and modules in a COM-based software architecture (as well as architectures). The operating system must locate the section of code that performs the function, using a library call or system call (a COM call). The time it takes to search out and locate the function can appreciably slow down the speed at which the application is executed.

SUMMARY OF THE INVENTION

Accordingly, what is needed is a system or method for speeding up the execution of applications, in particular those applications that interface with other applications and software components and modules. The present invention provides this advantage and others not specifically mentioned above but described in the sections to follow.

A method and system are described for implementing an application on a computer system, in particular a portable computer system, by binding an interface (e.g., a function call and required address translations) in the application to a specific memory address. The application is installed on the computer system with a reference to a section of computer code. The reference is for transferring execution of the application to that section of computer code in order to perform a particular function. After a specified criterion or threshold is satisfied (e.g., after a certain period of time has elapsed), the reference is replaced with a specific memory address in the computer system's memory map, such as a line number, thus binding the application and the operating system to that memory address for that function call. Accordingly, when the application makes a call to that function, the execution of the application can proceed directly to the line number where that function is located, instead of having to search out the location of the function using, for example, an address identifier scheme. As such, the call is completed more quickly, thereby speeding up the execution of the application and the operating system.

In the present embodiment, the application is downloaded onto a host device (e.g., a desktop) from a Web site, for example. The application is installed in a client device (e.g., a portable computer system or palmtop) at "sync time" (the time at which the client and host computer systems synchronize with each other to share information such as applications and databases). After a specified criterion or threshold is satisfied, a reference in the application to a section of code (e.g., a library call, system call) is replaced with function call to a memory address (e.g., a line number) for that section of code.

In one embodiment, a copy of the application retaining the reference in the application is stored on the host device. After the specified criterion is satisfied, the application is bound on the host device by replacing the reference in the application with the memory address (e.g., line number). The application (now bound) is then reinstalled on the client device at sync time.

The installation must preclude the code involved from being subsequently moved. Thus, in one embodiment, the code is placed in readonly memory. Alternatively, the code is marked as not being movable.

In one embodiment, the specified criterion is based on the elapsed time since the application was initially installed on the client device. In another embodiment, the specified criterion is based on the elapsed time since the application was last transferred from the client device to another device (e.g., the time since the application was beamed from one portable computer system to another portable computer system). In still another embodiment, the specified criterion is based on the number of times the application is beamed from the client device to other portable computer systems.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "generating" or "installing" or "receiving" or "transferring" or "inserting" or "modifying" or "building" or "storing" or "determining" or "replacing" or the like, refer to the action and processes of a computer system (e.g., processes 1000, 1100 and 1200 of FIGS. 10A, 10B and 12, respectively), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Platform

Figure 1A:
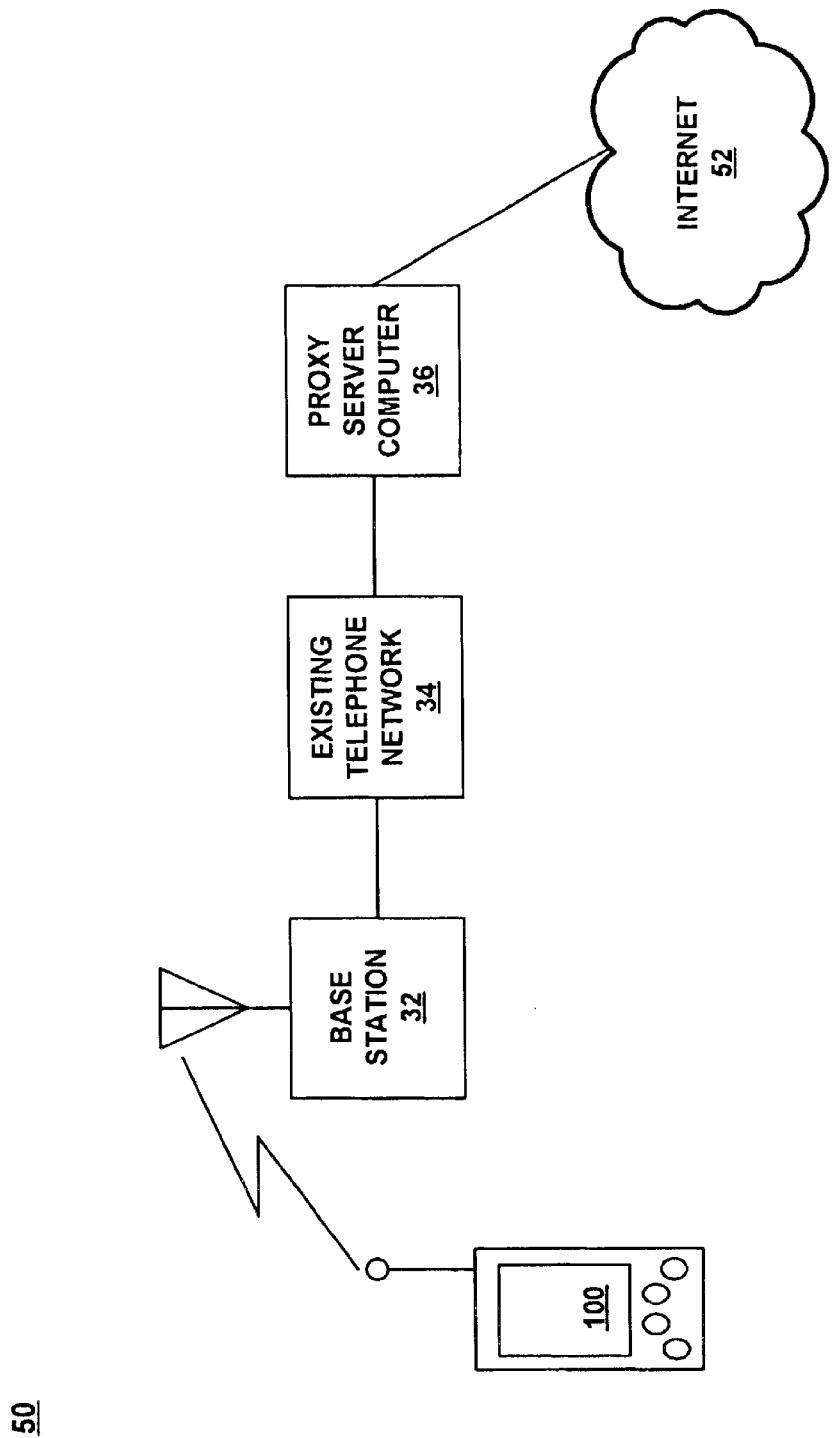
FIG. 1A is a block diagram of an exemplary network environment including a palmtop computer system in accordance with one embodiment of the present invention.

FIG. 1A is a block diagram of an exemplary network environment 50 including a portable computer system 100 in accordance with one embodiment of the present invention. Portable computer system 100 is also known as a palmtop or palm-sized computer system. In one embodiment, portable computer system 100 has the ability to transmit and receive data and information over a wireless communication interface (e.g., a radio interface).

In the present embodiment, base station 32 is both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that within the present embodiment, one of the functions of proxy server 36 is to perform operations over the Internet 52 on behalf of portable computer system 100. For example, proxy server 36 has a particular Internet address and acts as a proxy device for portable computer system 100 over the Internet 52.

It should be further appreciated that other embodiments of a communications network, planned or envisioned, may be utilized in accordance with the present invention. For example, a wireless connection may be made from portable computer system 100 directly to the Internet 52.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 1B:
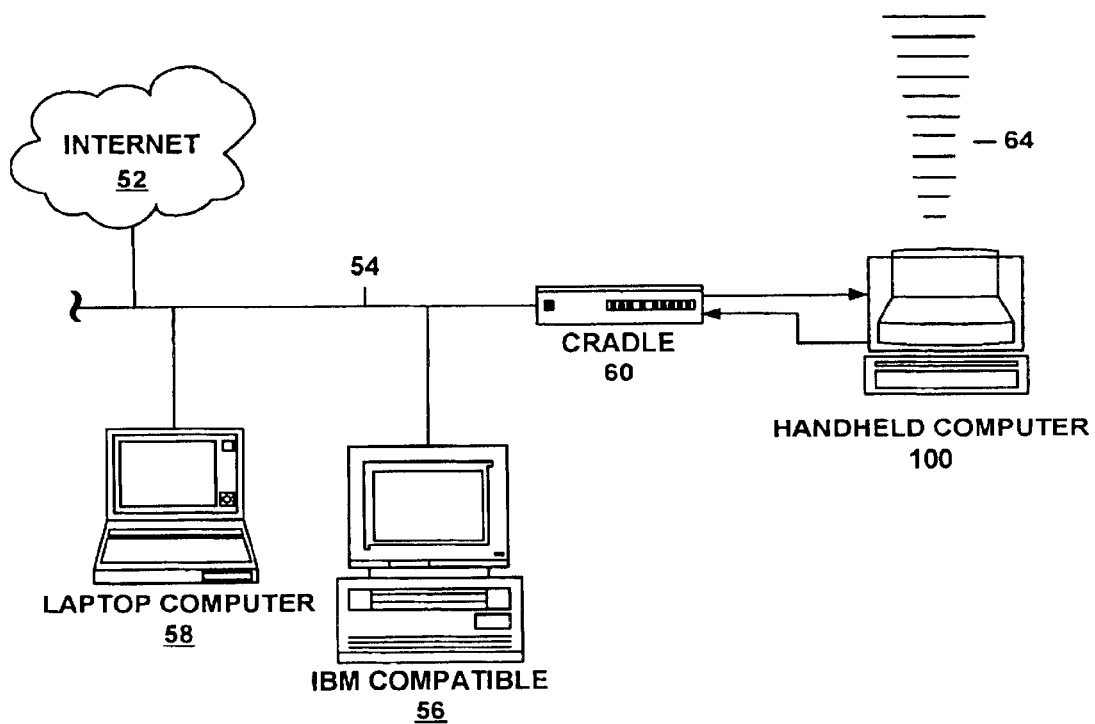
FIG. 1B is a block diagram of a palmtop computer system connected to other computer systems and the Internet via a cradle device in accordance with one embodiment of the present invention.

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 ("handheld computer") of the present invention. Cradle 60 provides an electrical and mechanical communication interface between bus 54 (and anything coupled to bus 54) and the computer system 100 for two-way communications. It is appreciated that, in accordance with the present invention, portable computer system 100 may instead be coupled to host computer systems 56 and 58 via a wireless (radio) connection. Computer system 100 also contains a wireless infrared communication mechanism 64 for sending and receiving information from other devices.

With reference to both FIGS. 1A and 1B, it is appreciated that portable computer system 100 can be used in a network environment combining elements of networks 50 and 51. That is, as will be seen below, portable computer system 100 can include both a wireless infrared communication mechanism and a signal (e.g., radio) receiver/transmitter device.

Figure 2:
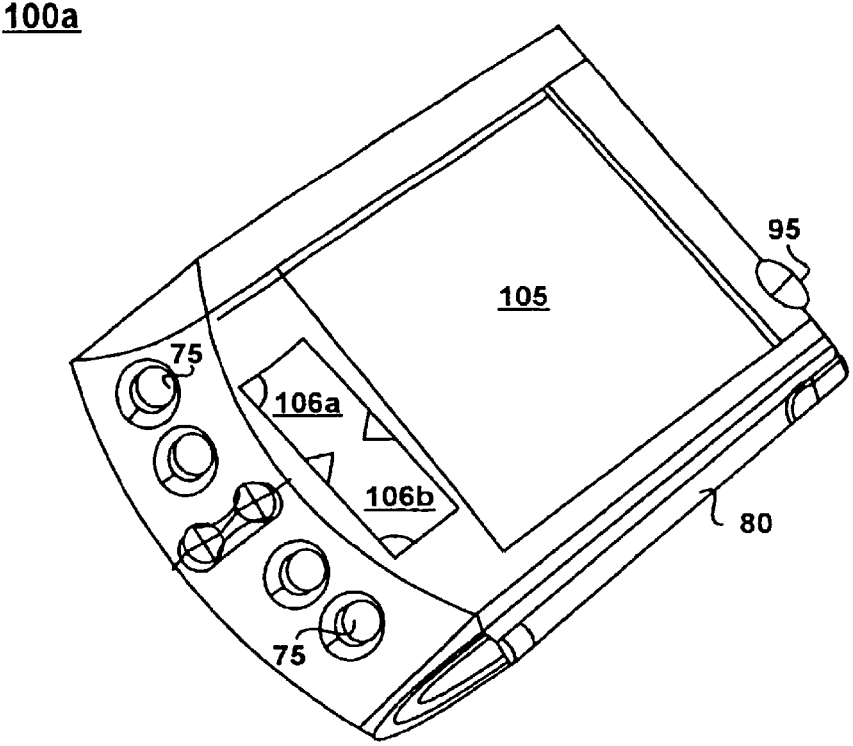
FIG. 2 is a top side perspective view of a palmtop computer system in accordance with one embodiment of the present invention.

FIG. 2 is a perspective illustration of the top face 100a of one embodiment of the palmtop computer system 100 of the present invention. The top face 100a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. The top face 100a also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
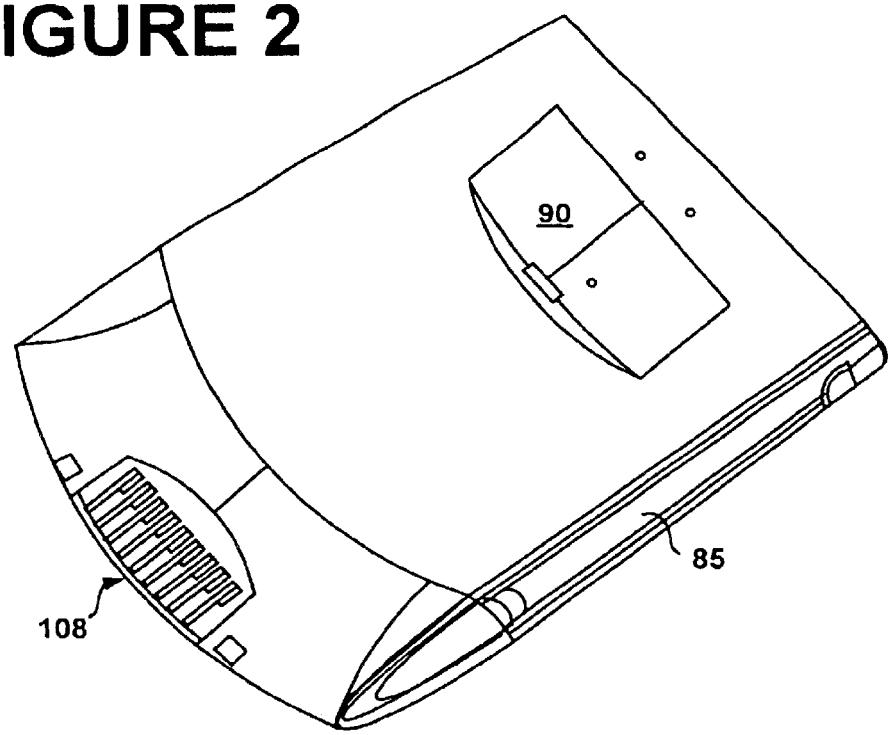
FIG. 3 is a bottom side perspective view of the palmtop computer system of FIG. 2.

FIG. 3 illustrates the bottom side 100b of one embodiment of the palmtop computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
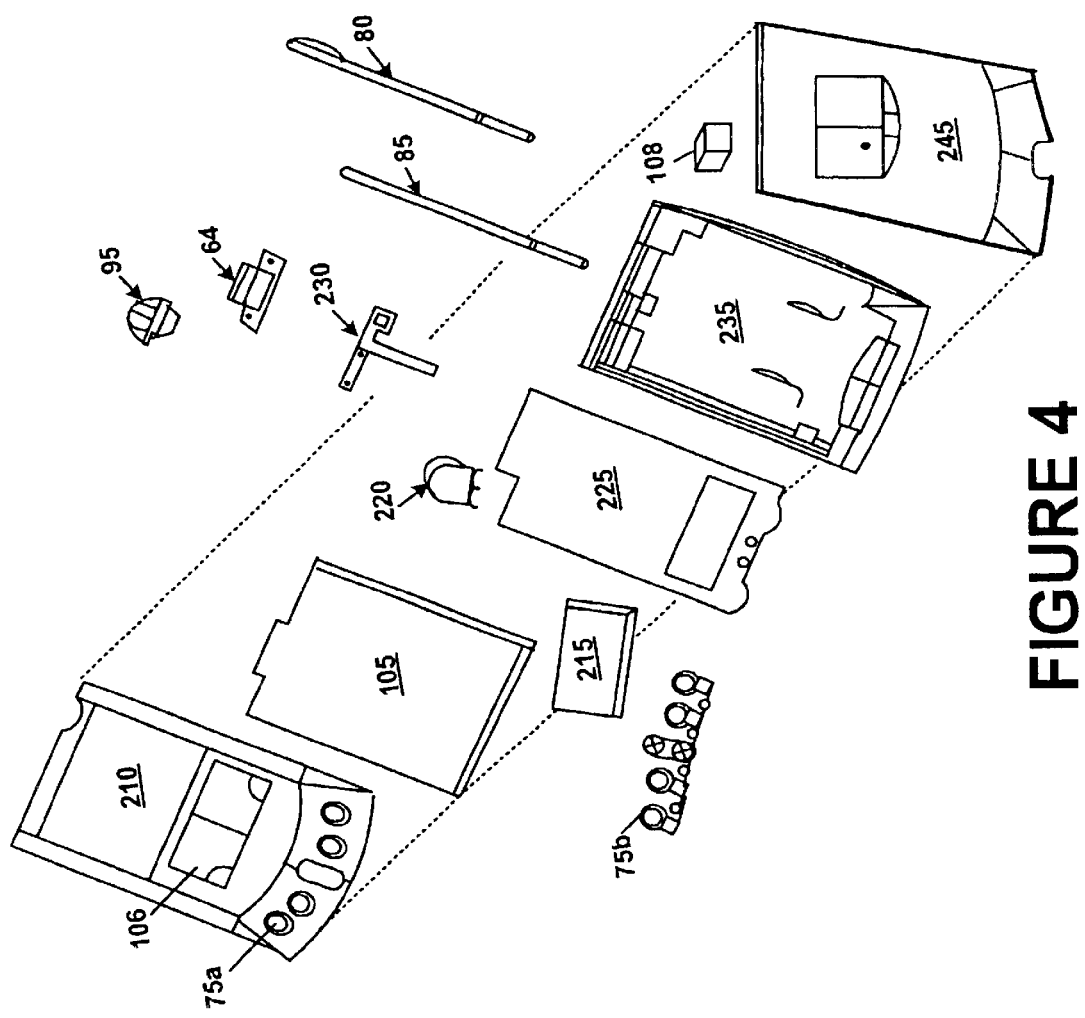
FIG. 4 is an exploded view of the components of the palmtop computer system of FIG. 2.

FIG. 4 is an exploded view of the palmtop computer system 100 in accordance with one implementation. Computer system 100 contains a back cover 245, and a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between computer system 100 and other networked computers and/or the Internet via a proxy server (see FIG. 1A).

Figure 5:
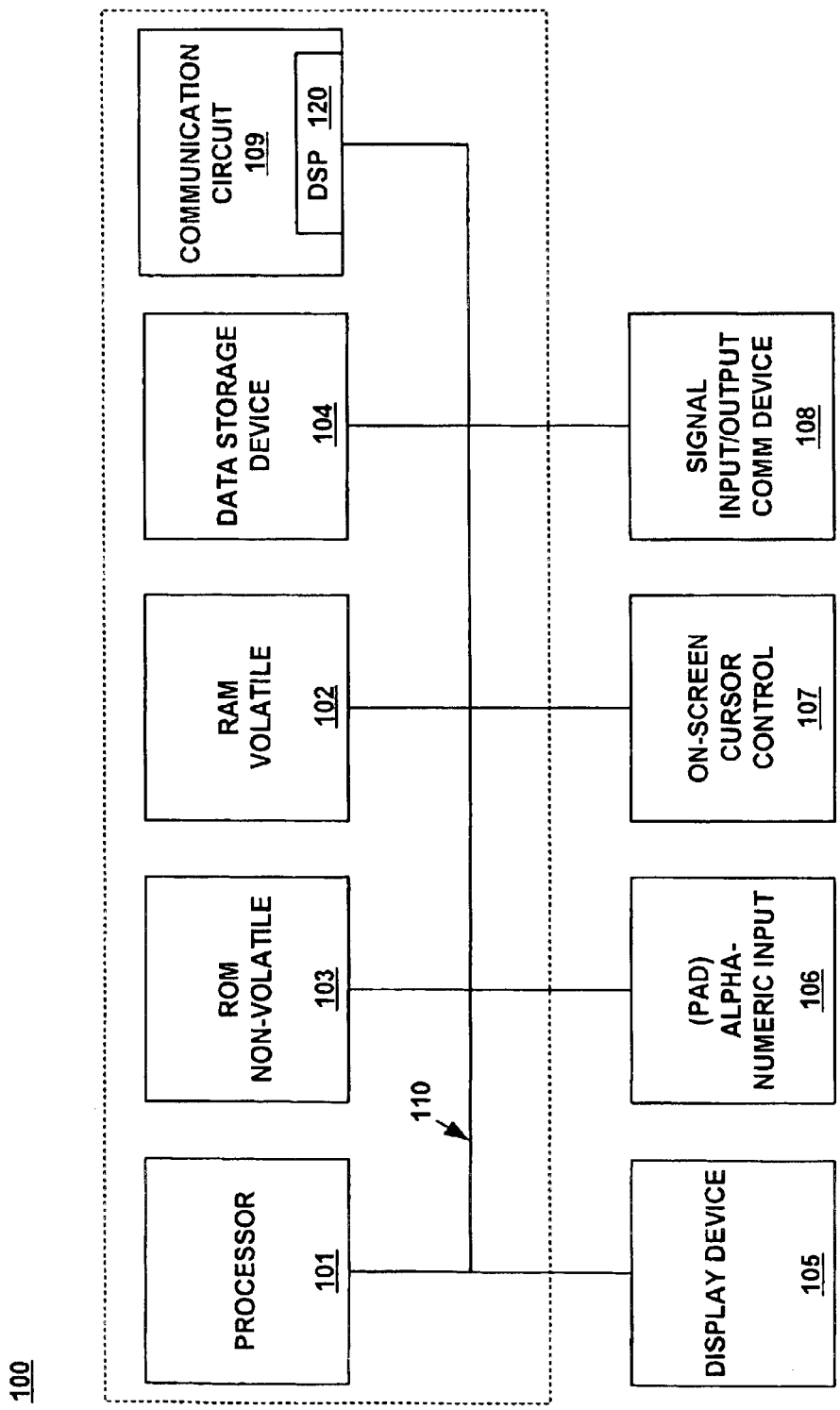
FIG. 5 is a block diagram of one embodiment of a portable computer system in accordance with the present invention.

FIG. 5 illustrates circuitry of computer system 100, some of which can be implemented on PC board 225 (FIG. 4). Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional data storage device 104 (e.g., memory stick) coupled with the bus 110 for storing information and instructions. Device 104 can be removable. As described above, computer system 100 also contains a display device 105 coupled to the bus 110 for displaying information to the computer user. PC board 225 can contain the processor 101, the bus 110, the ROM 103 and the RAM 102.

With reference still to FIG. 5, computer system 100 also includes a signal transmitter/receiver device 108, which is coupled to bus 110 for providing a physical communication link between computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 5 is an optional alphanumeric input device 106 that in one implementation is a handwriting recognition pad ("digitizer") having regions 106a and 106b (FIG. 2), for instance. Alphanumeric input device 106 can communicate information and command selections to processor 101. Computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6:
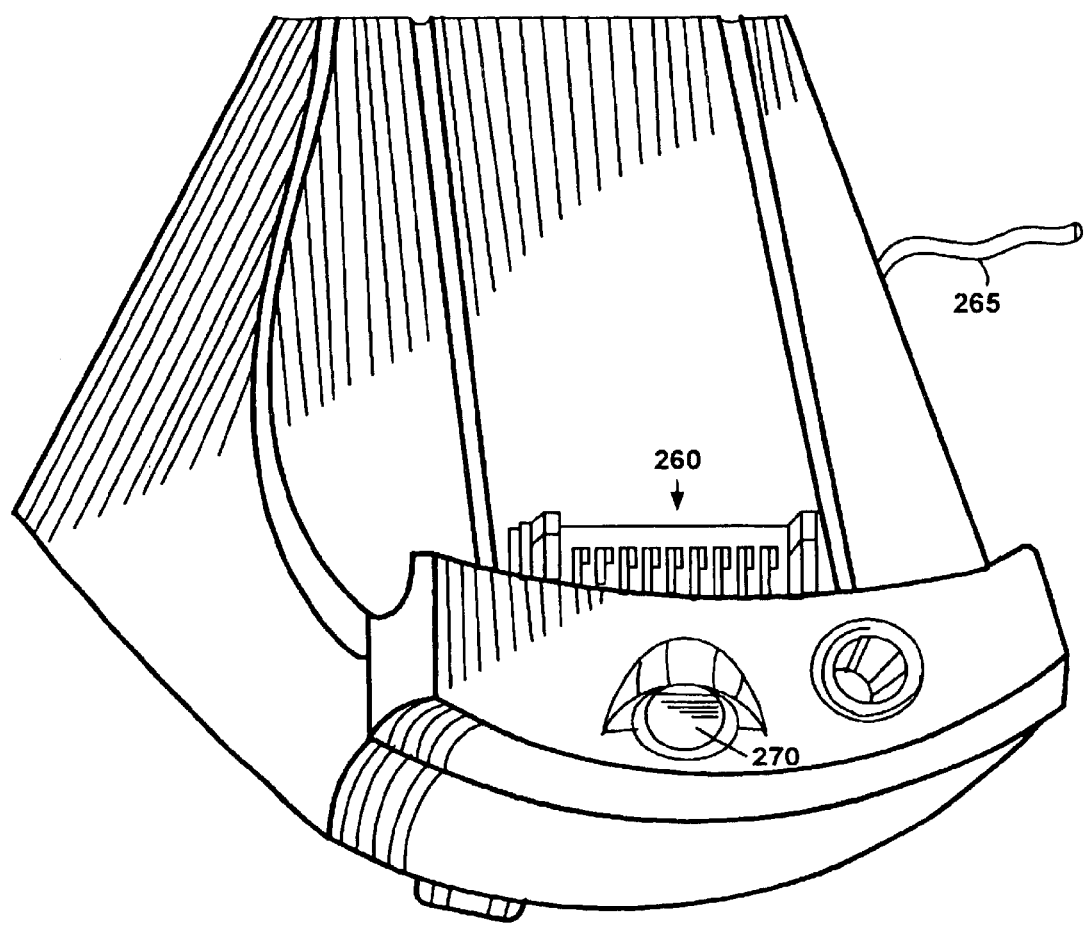
FIG. 6 is a perspective view of the cradle device for connecting the palmtop computer system to other systems via a communication interface in accordance with one embodiment of the present invention.

FIG. 6 is a perspective illustration of one embodiment of the cradle 60 for receiving the palmtop computer system 100. Cradle 60 contains a mechanical and electrical interface 260 for interfacing with communication interface 108 (FIG. 3) of computer system 100 when system 100 is slid into the cradle 60 in an upright position. Once inserted, button 270 can be pressed to initiate two-way communication (e.g., a communication session) between computer system 100 and other computer systems coupled to serial communication 265.

Exemplary Desktop/Laptop Platform

Figure 7:
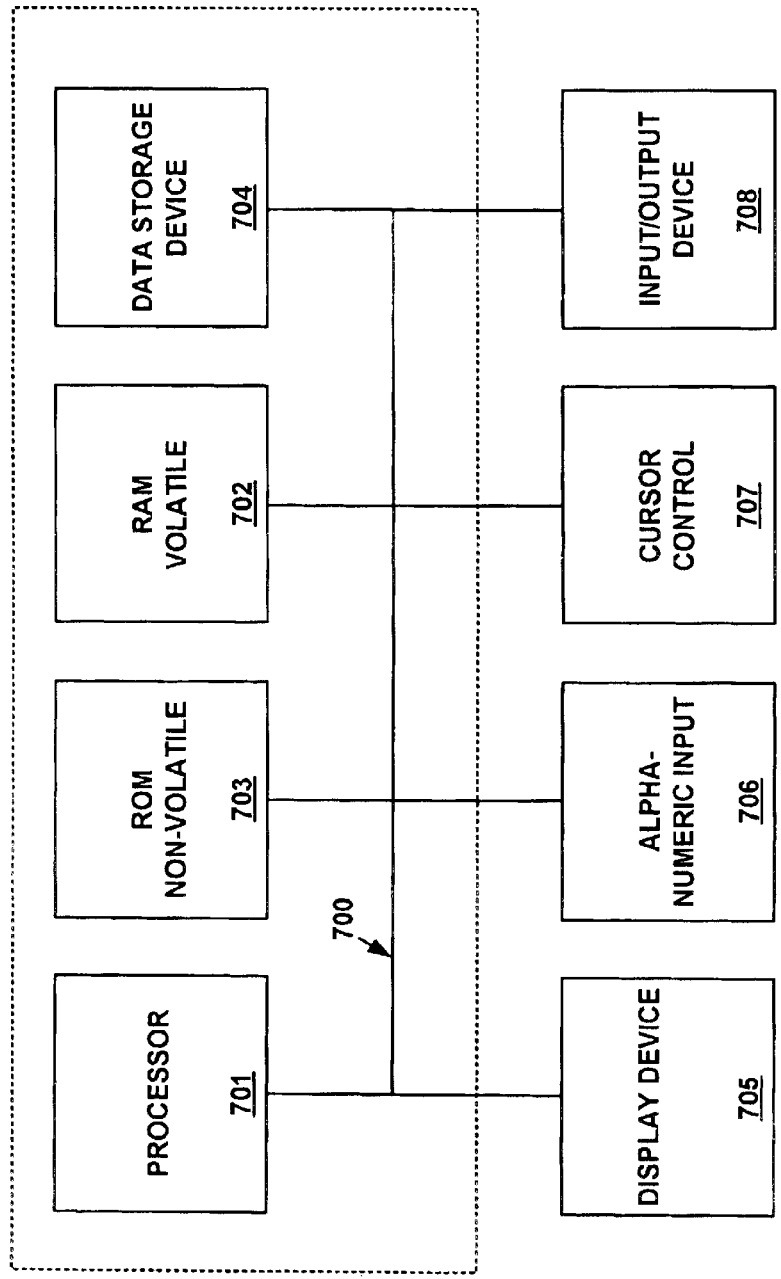
FIG. 7 is a block diagram of one embodiment of a desktop or laptop computer system in accordance with the present invention.

Refer now to FIG. 7 which illustrates an exemplary host computer system 342 (e.g., desktop computer system 56 or laptop computer system 58 of FIG. 1B) upon which embodiments of the present invention may be practiced. In one embodiment, host computer system 342 may instead be a server computer system in a computer system network (including the World Wide Web) or a proxy server computer (e.g., proxy server 36 of FIG. 1B).

Continuing with reference to FIG. 7, in general, computer system 342 comprises bus 700 for communicating information, processor 701 coupled with bus 700 for processing information and instructions, random access (volatile) memory (RAM) 702 coupled with bus 700 for storing information and instructions for processor 701, read-only (non-volatile) memory (ROM) 703 coupled with bus 700 for storing static information and instructions for processor 701, data storage device 704 such as a magnetic or optical disk and disk drive coupled with bus 700 for storing information and instructions, an optional user output device such as display device 705 coupled to bus 700 for displaying information to the computer user, an optional user input device such as alphanumeric input device 706 including alphanumeric and function keys coupled to bus 700 for communicating information and command selections to processor 701, and an optional user input device such as cursor control device 707 coupled to bus 100 for communicating user input information and command selections to processor 701. Furthermore, an optional input/output (I/O) device 708 is used to couple computer system 342 to, for example, a communication bus (e.g., communication bus 54 of FIG. 1B).

Continuing with reference to FIG. 7, display device 705 utilized with computer system 342 may be a liquid crystal device, cathode ray tube, or other display device suitable for creating graphic images and alphanumeric characters recognizable to the user. Cursor control device 707 allows the computer user to dynamically signal the two-dimensional movement of a visible symbol (pointer) on a display screen of display device 705. Many implementations of the cursor control device are known in the art including a trackball, mouse, joystick or special keys on alphanumeric input device 706 capable of signaling movement of a given direction or manner of displacement. It is to be appreciated that the cursor control 707 also may be directed and/or activated via input from the keyboard using special keys and key sequence commands. Alternatively, the cursor may be directed and/or activated via input from a number of specially adapted cursor directing devices.

Figure 8:
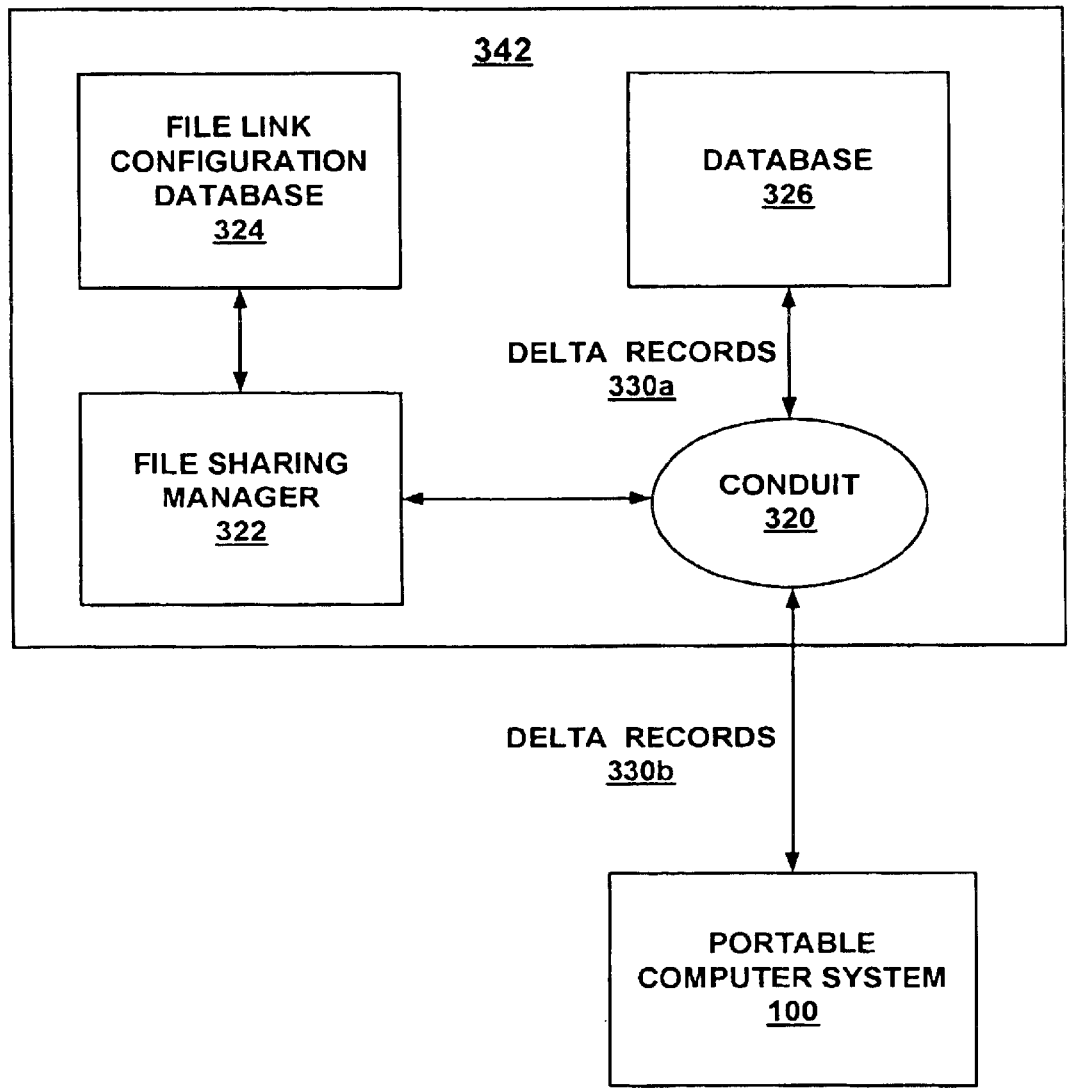
FIG. 8 is a block diagram of a one embodiment of a system for allowing a palmtop computer system and another computer system to share information in accordance with the present invention.

FIG. 8 illustrates a system 340 in accordance with one embodiment of the present invention for allowing a portable computer system 100 (e.g., a palmtop or any portable computer system) to share information with a host computer system 342 (FIG. 7). Computer system 342 contains database 326, a software file sharing manager 322 (e.g., a hot-sync software manager), a file link configuration database 324, and a software conduit 320. The file link configuration database 324 is linked to the file sharing manager 322 and specifies, for a particular database, its source file, category information, and the frequency of update for the database. Conduit 320 outlines the manner in which records are to be synchronized between databases under control of file sharing manager 322. This process, including the file sharing manager and the conduit, is described in U.S. Pat. No. 5,884,323 by Hawkins et al., issued Mar. 16, 1999, assigned to the assignee of the present invention and hereby incorporated by reference.

With reference still to FIG. 8, portable computer system 100 is interfaced with computer system 342 using cradle 60 (FIG. 1B). Alternatively, portable computer system 100 can be interfaced with computer system 342 using a wireless (e.g., radio) connection. During synchronization between portable computer system 100 and database 326, delta records 330a and 330b are passed through conduit 320 between database 326 and a database of portable computer system 100 under control of the file sharing manager 322. Delta records 330a and 330b represent changes (including additions) that occurred on either portable computer system 100 or on computer system 342. After synchronization, these two databases will contain the same information. Namely, records updated on portable computer system 100 are reflected in database 326 and vice versa. The synchronization process (including the file sharing manager) is described in U.S. Pat. No. 6,006,274 by Hawkins et al., issued Dec. 21, 1999, assigned to the assignee of the present invention and hereby incorporated by reference. Synchronization is also described in U.S. Pat. No. 5,727,202 by Kucala, issued Mar. 10, 1998, assigned to the assignee of the present invention and hereby incorporated by reference, and also in U.S. Pat. No. 5,832,489 by Kucala, issued Nov. 3, 1998, assigned to the assignee of the present invention and hereby incorporated by reference.

Process for Installing an Application

Figure 9A:
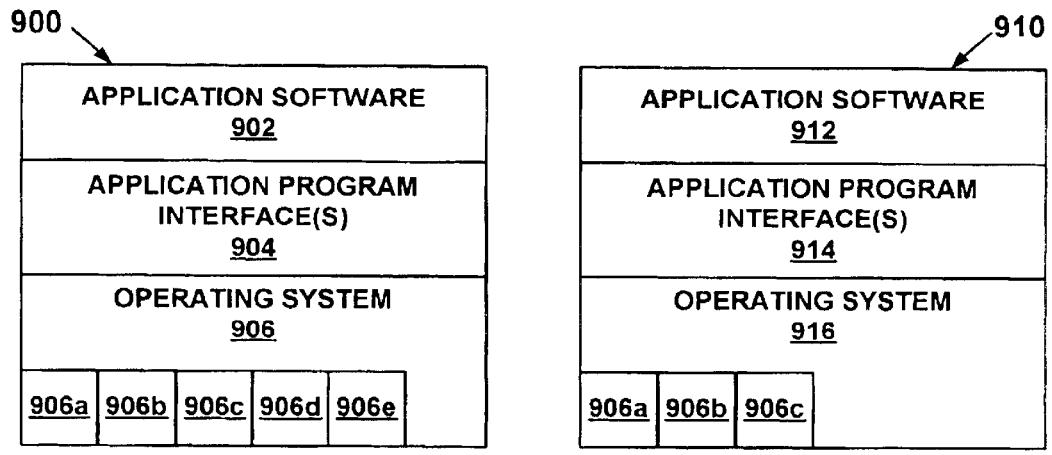
FIG. 9A is a block diagram showing a software platform used on a portable computer system in accordance with one embodiment of the present invention.

FIG. 9A is a block diagram of software platforms 900 and 910 in accordance with one embodiment of the present invention. Software platform 900 represents the total set of applications, application program interfaces and operating system software routines that can be used on a portable computer system 100 (FIG. 5). Software platform 910 represents a subset of software platform 900 that can be derived from software platform 900 and installed on portable computer system 100 in accordance with one embodiment of the present invention.

With reference to FIG. 9A, software platform 900 includes an application software layer 902, which includes the many different software applications that can operate within portable computer system 100. Application software layer 902 communicates data, data packets, and other types of information with application program interface (API) layer 904. APIs are well known by those of ordinary skill in the art as a mechanism for providing a common interface between application software layer 902 and operating system 906. Operating system 906 is comprised of a plurality of software routines or modules 906a–e that operate in a known manner to provide the resources and services needed to support the execution of the applications and APIs in application software layer 902 and API layer 904.

In accordance with the present embodiment of the present invention, software platform 910 represents a subset of software platform 900 that can be used on a portable computer system 100. Software platform 910 includes an application software layer 912, an application program interface layer 914, and an operating system 916 comprised of a plurality of software routines or modules 906a–c. Application software layer 912 includes those applications installed on portable computer system 100. In accordance with the present embodiment of the present invention, operating system 916 is comprised of only those software routines or modules 906a–c that are needed in order to support the execution of the applications and APIs in software layer 912 and API layer 914. Thus, in accordance with the present invention, software platform 910 uses less memory than software platform 900, thereby more efficiently using the memory resources on portable computer system 100. Additional information is provided in conjunction with FIG. 10B.

Figure 9B:
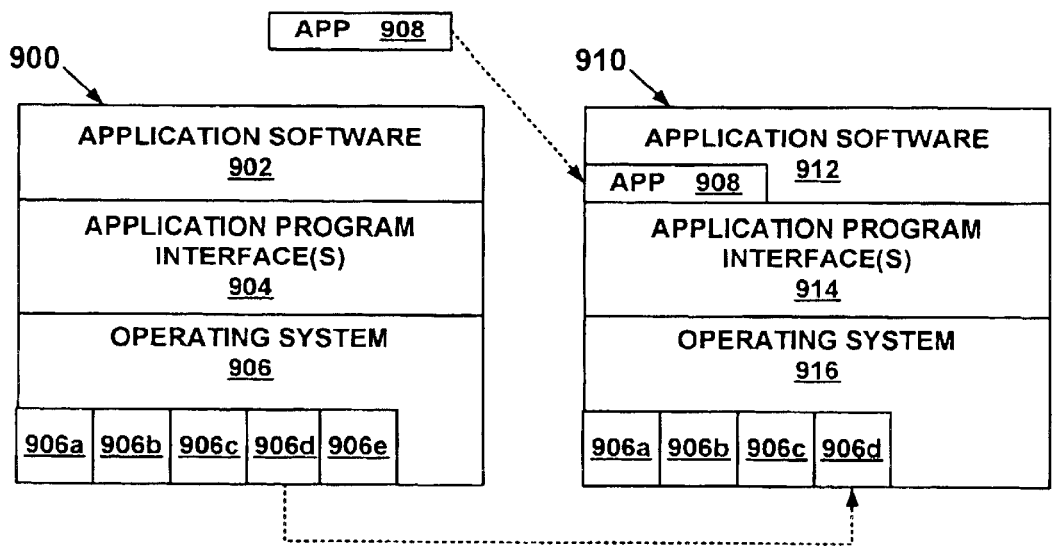
FIG. 9B is a block diagram illustrating the installation of an application onto a palmtop computer system in accordance with one embodiment of the present invention.

FIG. 9B is a block diagram illustrating the installation of a new application 908 onto a palmtop computer system 100 in accordance with one embodiment of the present invention. In accordance with the present embodiment of the present invention, a memory image of a subset of operating system 906 is generated. In the present embodiment, the memory image comprises the software routine(s) (e.g., software routine 906d), or a portion of one or more software routines, that in combination with software routines 906a–c. used by operating system 916 on portable computer system 100 allow application 908 to be used on the portable computer system. In another embodiment, a memory image is generated containing the software routine(s), or portions of one or more software routines, that are required to use application 908 as well as the applications already on portable computer system 100 (e.g., the memory image comprises software routines 906a–d. Additional information is provided in conjunction with FIG. 10A.

Thus, in the former embodiment of the preceding paragraph, the memory image comprises the incremental changes to operating system 916 needed to support application 908, while in the latter embodiment, the memory image comprises a more complete operating system needed to support application 908 and the other applications installed on portable computer system 100. In either embodiment, operating system 916 of the portable computer system contains only those software routines needed to support the installed applications, thus efficiently using the memory resources available on the portable computer system.

In the present embodiment of the present invention, the operating system 916 is modified at sync time to incorporate the memory image comprising either software routine 906d or the memory image comprising the modified operating system 916 (that is, the memory image containing software routines 906a–d). New application 908 is also downloaded onto portable computer system 100 at sync time.

Figure 10A:
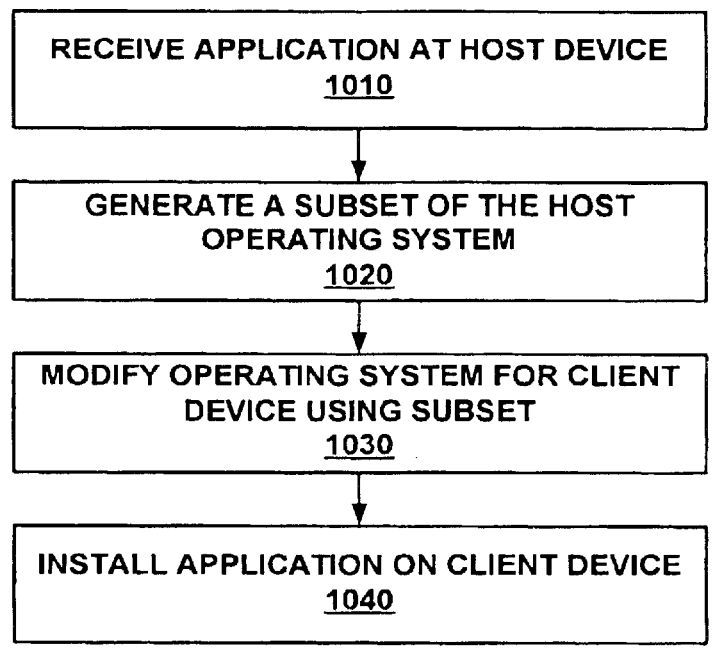
FIG. 10A is a flowchart of the steps in a process for installing an application on a palmtop computer system in accordance with one embodiment of the present invention.

FIG. 10A is a flowchart of one embodiment of the steps in a process 1000 for installing a new application from a host device (e.g., computer system 342 of FIG. 7) to a client device (e.g., portable computer system 100 of FIG. 1B) in accordance with the present invention. In the present embodiment, process 1000 can be implemented by computer system 342 as computer-readable program instructions stored in a memory unit (e.g., ROM non-volatile 703 of FIG. 7) and executed by a processor (e.g., processor 701 of FIG. 7). In one embodiment, process 1000 is performed during the synchronization process described in conjunction with FIG. 8; however, it is appreciated that process 1000 is not limited to the synchronization process.

In step 1010 of FIG. 10A, the application to be installed on portable computer system 100 (e.g., application 908 of FIG. 9B) is identified on computer system 342. The application can be received at the host device from a site on the World Wide Web via Internet 52 (FIG. 1B), from another computer system via a local area network, or from some other source.

In one embodiment, application 908 is based on the well-known Component Object Model (COM) software architecture or one of the other wellknown architectures such as Common Object Request Broker Architecture (CORBA), Distributed COM (DCOM), and Distributed Computing Environment (DCE). In these cases, it may be necessary for computer system 342 to build application 908; the manner in which an application is built in accordance with these software architectures is also well-known in the art. Thus, in accordance with the present invention, because application 908 is built on computer system 342, it is not necessary for portable computer system 100 to have software/code for supporting software architectures such as COM, thereby saving memory space in the portable computer system.

In step 1020 of FIG. 10A, with reference also to FIG. 9B, a subset of operating system 906 is generated. As part of the synchronization process described in conjunction with FIG. 8, computer system 342 has the capability to identify whether operating system 916 needs to modified, updated or added to in order to support application 908. Thus, in one embodiment, computer system 342 can generate the incremental changes that need to be made to operating system 916 in order to support application 908.

Accordingly, in one embodiment, the subset comprises the software routine(s) (e.g., software routine 906*d*) or a portion of one or more software routines that, in combination with software routines 906*a*–*c* already used by operating system 916 on portable computer system 100, support application 908 (e.g., allow the application to be used on the portable computer system). In another embodiment, the subset comprises the entire set of software routines 906*a*–*d* that are required to use application 908 as well as the other applications installed on portable computer system 100.

It is appreciated that computer system 342 also has the capability to identify unique characteristics of portable computer system 100 that are pertinent to identifying the changes that are needed to operating system 916. That is, for example, computer system 342 can identify the type of hardware (e.g., the type of processor) being used by portable computer system 100, and consequently can tailor the application and the subset of the operating system accordingly.

In step 1030 of FIG. 10A, with reference also to FIG. 9B, operating system 916 is modified to incorporate the subset of operating system 906 generated in step 1020. In the present embodiment, step 1030 is performed during the synchronization process discussed above in conjunction with FIG. 8. In one embodiment, in which the subset contains only the incremental changes to the operating system, the subset is added to the current contents of operating system 916. In another embodiment, in which the subset comprises the entire set of software routines 906*a*–*d*, the software routines can be overwritten, updated or modified accordingly.

In step 1040, application 908 is installed on portable computer system 100.

It is appreciated that process 1000 can be implemented with a graphical user interface (GUI) or similar mechanism that allows the user of portable computer system 100 to select applications to be installed on portable computer system 100. Thus, the present embodiment of the present invention can be automatically performed at sync time, or it can be implemented under the direction of and at the discretion of the user.

The present embodiment of the present invention, in particular process 1000, has been described in a context in which a new application is to be installed onto portable computer system 100. However, it is appreciated that the present embodiment of the present invention can also be used to update or delete one or more applications on portable computer system 100, or to install a new API, update an existing API, or delete an API from portable computer system 100.

For example, a GUI can be used to select applications to be removed from portable computer system 100. In this latter case, those portions of operating system 916 of portable computer system 100 that are no longer needed because, for example, the applications they support have been removed can also be removed from portable computer system 100 during the synchronization process.

Figure 10B:
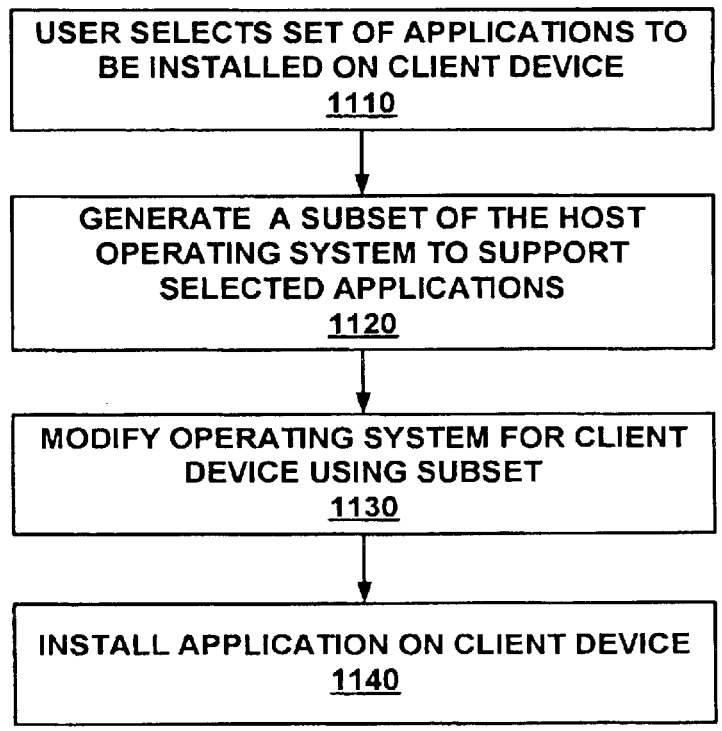
FIG. 10B is a flowchart of one embodiment of the steps in a process in which a user selects a set of applications to be installed on a palmtop computer system in accordance with the present invention.

FIG. 10B is a flowchart of one embodiment of the steps in a process 1100 in which a user selects a set of applications to be installed from a host device (e.g., desktop computer system 56 or laptop computer system 58 of FIG. 1B, exemplified by computer system 342 of FIG. 7) on a client device (e.g., portable computer system 100 of FIG. 1B) in accordance with the present invention. In the present embodiment, process 1100 can be implemented by computer system 342 as computer-readable program instructions stored in a memory unit (e.g., ROM non-volatile 703 of FIG. 7) and executed by a processor (e.g., processor 701 of FIG. 7). In one embodiment, process 1100 is performed during the synchronization process described in conjunction with FIG. 8; however, it is appreciated that process 1100 is not limited to the synchronization process.

In step 1110 of FIG. 10B, the user identifies the set of applications to be installed on portable computer system 100, using a GUI for example. The user can also identify applications to be deleted from portable computer system 100, applications to be updated (for example, with newer versions), and applications that are to remain as they are.

In step 1120, with reference also to FIG. 9B, based on the set of applications identified in step 1110, a memory image comprising a subset of operating system 906 is generated. In one embodiment, the memory image comprises the incremental changes (additions and deletions) that need to be made to operating system 916 in order to support the selected set of applications. In another embodiment, the memory image comprises the more complete set of software routine(s) that are required to use the set of selected applications on portable computer system 100.

In step 1130 of FIG. 10B, with reference also to FIG. 9B, operating system 916 is modified or replaced as appropriate based on step 1120. In one embodiment, in which the subset contains only the incremental changes to the operating system, the subset is added to the current contents of operating system 916. In another embodiment, in which the subset comprises the entire set of software routines 906*a*–*d*, the software routines can be overwritten, updated or modified accordingly.

In step 1140 of FIG. 10B and with reference also to FIG. 9B, in the present embodiment, the selected set of applications are loaded onto portable computer system 100.

Thus, the present embodiment of the present invention provides a method and system thereof in which a memory image is built at sync time and loaded onto the client device (e.g., portable computer system 100), such that the memory image includes only the specific code and resources required to support the client device and the application(s) installed on the client device. In another-embodiment, the present invention includes the concept of synchronizing the presently installed operating system and installing a new application or set of applications with only the changes ("deltas")

in the operating system required by the new application. The present embodiment of the present invention removes the need to install software/code or resources not required by the specific type of client device or the applications installed thereon, thereby saving memory space on the client device.

Process for Binding an Application

Figure 11:
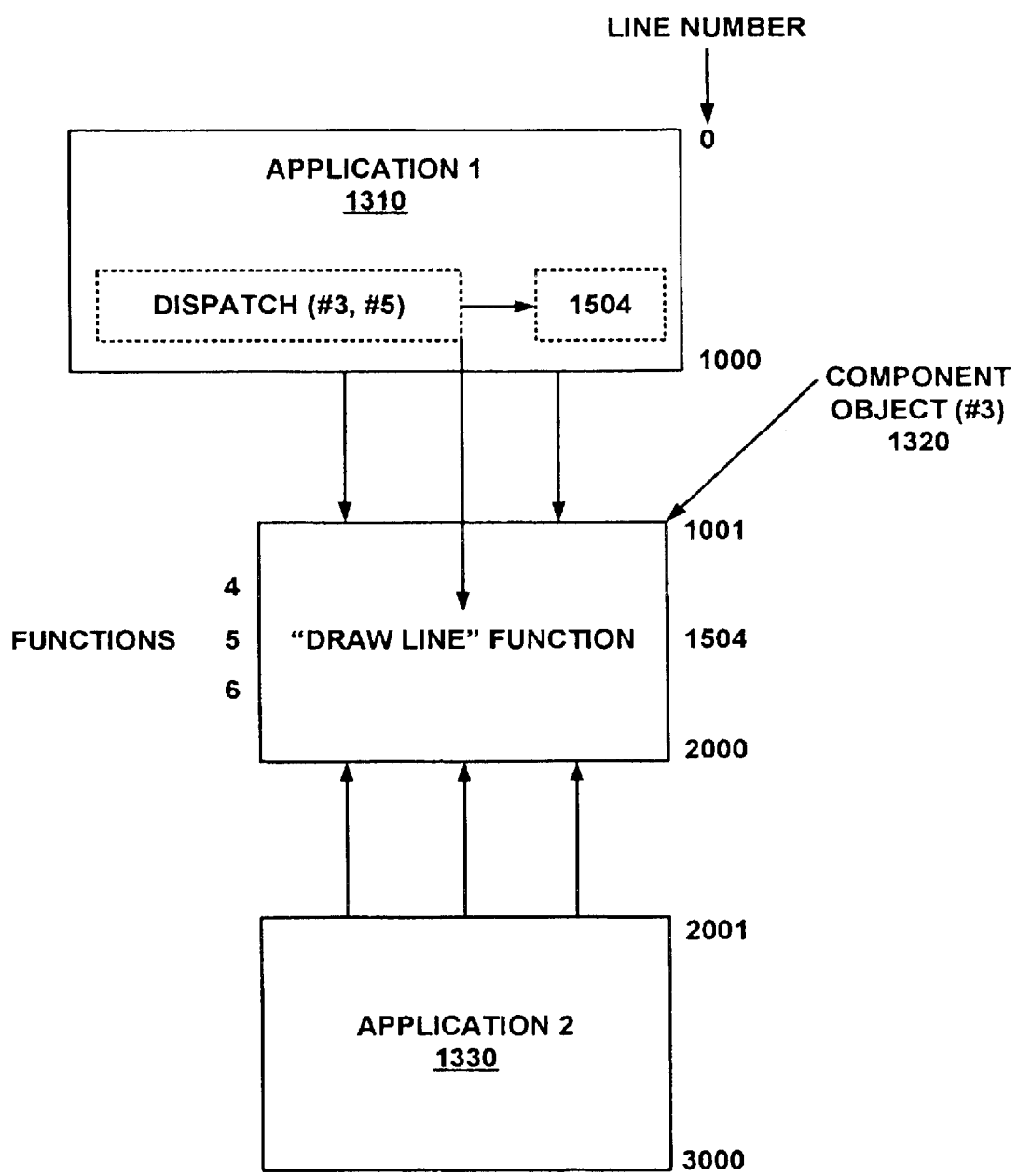
FIG. 11 illustrates a memory map of the memory of a palmtop computer system showing an application bound to a section of code in accordance with one embodiment of the present invention.

FIG. 11 illustrates a memory map of the memory of portable computer system 100 (FIG. 5) showing an application 1310 bound to a section of code in accordance with one embodiment of the present invention. Each of the two applications 1310 and 1330 make a "call" (a transfer of the execution of the application) to component object 1320 in accordance with one embodiment of he present invention. In the present embodiment, applications 1310 and 1330 and component object 1320 may be based on well-known software architectures such as COM, CORBA, DCOM, and DCE.

Component object 1320 comprises a plurality of different functions that may be used by applications 1310 and 1330. For example, during the execution of application 1310, if a particular function (e.g., a "draw line" function) needs to be performed, the execution is transferred to component object 1320 for that function. Upon completion of the function, the execution is transferred back to application 1310. Similarly, application 1330 can also be connected with component object 1320 for the draw line function or for some other function. It is appreciated that an application can have multiple calls.

In accordance with the present embodiment of the present invention, a call in an application (e.g., application 1310) to a specific function in component object 1320 is made with reference to a specific memory address in component object 1320 where that function is located (e.g., a physical memory location or a line number). In this embodiment, a line of code in application 1310 (the line of code at which the call is located) is linked to a line of code where the function being called is located; this process is referred to as "binding." For example, the previous reference to the function (e.g., a library or system call to "draw line") is replaced with a function call to a memory address (e.g., line 1504). Specifically, a "dispatch" to a particular component object and function is linked to a particular line number. For example, if component object 1320 is component object "#3" and the draw line function is function "#5," then dispatch (#3, #5) is linked to line 1504. In this manner, application 1310 is "bound" to component object 1320; specifically, a draw line call in application 1310 is bound to line 1504. It is appreciated that an application can be bound to multiple physical memory locations in more than one component objects. Similarly, component objects can be bound to other component objects.

By binding an application to a specific memory address in a component object in accordance with the present embodiment of the present invention, the call to the referenced function occurs more quickly, improving the overall processing efficiency of the device executing the application. In addition, there is a potential memory space benefit when the function call is smaller than the library call and the code is rearranged to eliminate this unneeded space.

Figure 12:
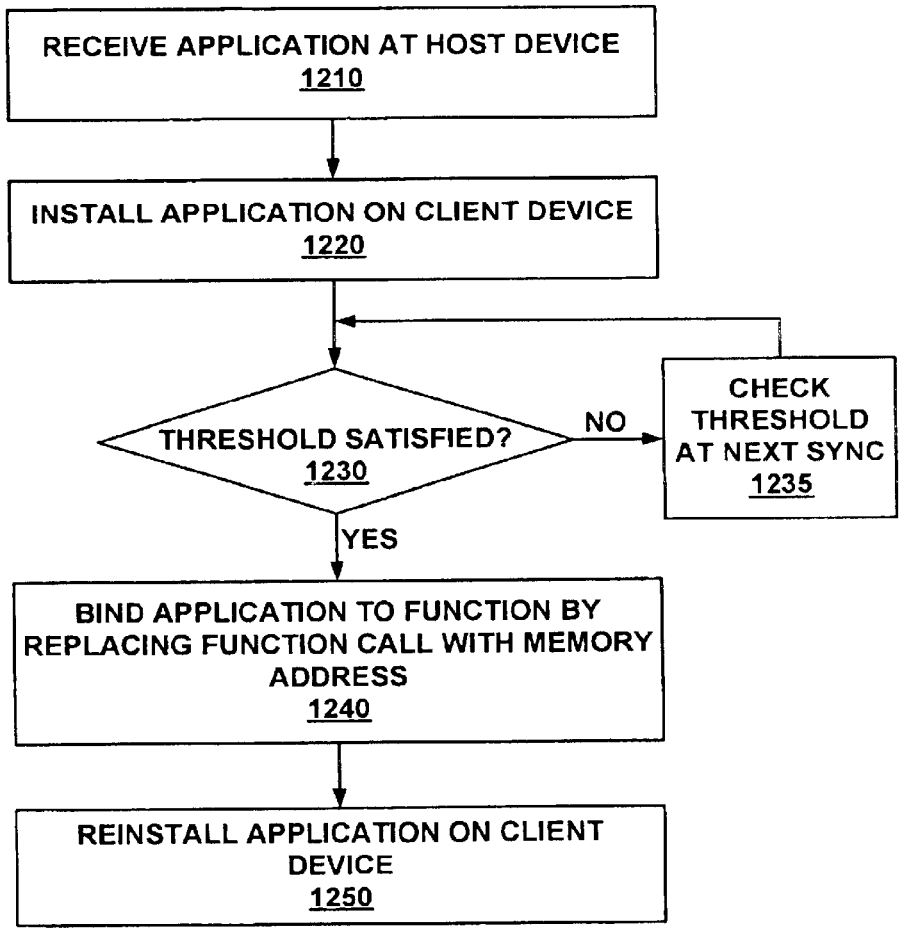
FIG. 12 is a flowchart of the steps in a process for binding an application to a memory address in accordance with one embodiment of the present invention.

FIG. 12 is a flowchart of one embodiment of the steps in a process 1200 for binding an application in accordance with the present invention. In the present embodiment, process 1200 can be implemented by computer system 342 (FIG. 7) as computer-readable program instructions stored in a memory unit (e.g., ROM non-volatile 703 of FIG. 7) and executed by a processor (e.g., processor 701 of FIG. 7). Steps 1220, 1230, 1240 and 1250 of process 1200 are typically performed during the synchronization process described in conjunction with FIG. 8; however, it is appreciated that process 1200 is not limited to the synchronization process.

In step 1210 of FIG. 12, the application to be installed (e.g., application 1310 of FIG. 11) on portable computer system 100 is received at computer system 342. The application can be received at the host device from a site on the World Wide Web via Internet 52 (FIG. 1B), from another computer system via a local area network, or from some other source.

In step 1220 of FIG. 12, in the present embodiment, application 1310 is installed in portable computer system 100 using, for example, the synchronization process described in conjunction with FIG. 8. In one embodiment, application 1310 is installed on portable computer system 100 using process 1000 of FIG. 10A.

In step 1230 of FIG. 12, in one embodiment, before application 1310 is bound to component object 1320 (FIG. 11), a threshold criterion must be satisfied. In another embodiment, the component objects are bound at the time when application 1310 is first built on computer system 342 (step 1210), without considering a threshold criterion.

If the threshold criterion is satisfied, binding is performed during the synchronization currently being performed (step 1240). Otherwise, the binding is not performed but is performed at a later sync time. The threshold criterion is checked each time synchronization is performed (step 1235).

The threshold criterion is utilized because, once an application is bound to component object 1320 in portable computer system 100, it may be difficult to share the application with another portable computer system. For example, it is popular to beam an application from one palmtop computer to a second palmtop using an infrared signal (see discussion pertaining to FIG. 4). However, after binding, the application contains a reference to a specific physical memory location (e.g., line number) for a particular function (e.g., line 1504 for the draw line function). Thus, the draw line function may be located at a different line number in the second palmtop. Accordingly, the application may not perform properly on the second palmtop.

In one embodiment, the threshold criterion is based on the elapsed time since application 1310 was installed on portable computer system 100 (in step 1220). In another embodiment, the threshold criterion is based on the elapsed time since the last time application 1310 was beamed from portable computer system 100 to another computer system. In these embodiments, the purpose of the threshold criterion is to allow a user a period of time to beam application 1310 to another user before the application is bound, or to delay binding until it appears that the application will no longer be beamed. It is appreciated that other threshold criterion may be utilized for other purposes in accordance with the present invention. For example, the threshold criterion can be based on the number of times the application is beamed from portable computer system 100 to other portable computer systems.

In the present embodiment, if binding is not performed during the current synchronization, a copy of application 1310 is maintained on computer system 342. This copy of the application can be bound by computer system 342 when the threshold criterion is satisfied, and the bound copy can be used to replace the unbound version of the application on portable computer system 100 at a later sync time. Thus application 1310 does not have to be transferred back and forth between portable computer system 100 and computer system 342 in order to be bound.

In step 1240 of FIG. 12, the application is bound as described above in conjunction with FIG. 11.

In step 1250 of FIG. 12, application 1310 (now bound) is reinstalled in portable computer system 100 using, for example, the synchronization process described in conjunction with FIG. 8. The installation must preclude the code involved from being subsequently moved. Thus, in one embodiment, the code is placed in read-only memory. Alternatively, the code is marked as not being movable.

The present embodiment of the present invention is described in the context of installing an application from a host computer device (e.g., computer system 342) to a portable computer system 100. However, it is appreciated that the present embodiment of the present invention may be utilized in other types and combinations of computer systems. Furthermore, the present embodiment of the present invention may be utilized to bind an application, a component object or a line of code to another application, component object or line of code in any type of single storage system (e.g., a memory unit such as ROM, RAM, etc.), or in two different storage systems on the same or on different devices.

Thus, the present embodiment of the present invention provides a method and system thereof for binding an application to a specific physical memory location (e.g., a line number) that corresponds to a line or section of code for performing a particular function. Accordingly, when the application makes a call to that function, the execution of the application can proceed directly to the physical location where that function is located, instead of having to search out the location of the function. As such, the call is completed more quickly, thereby speeding up the execution of the application.

The preferred embodiment of the present invention is thus described. While the present invention has been described in particular embodiments, it should be appreciated that the present invention should not be construed as limited by such embodiments, but rather construed according to the below claims.

What is claimed is:

1. A method of implementing an application in a computer system, said method comprising:
  a) said computer system receiving said application from an external source and storing said application in computer-readable memory resident in said computer system, said application having multiple references each to a respective section of computer code stored in an associated memory location in computer-readable memory resident in said computer system, said multiple references each for transferring execution of said application to said respective section of computer code;
  b) upon satisfying a specified criterion, said computer system determining a memory address in computer-readable memory resident in said computer system, said memory address identifying said associated memory location for said respective section of computer code and repeating step b) for each of said multiple references, wherein said specified criterion is based on time elapsed since said application was installed in said computer system;
  c) replacing each reference of said multiple references with its associated memory address; and
  d) preventing each said respective section of computer code from being subsequently moved from its associated memory location and its associated memory address.

2. The method as recited in claim 1 wherein said computer system is a first portable computer system.

3. The method as recited in claim 2 wherein said external source is a second portable computer system, wherein said application is received using a wireless signal between said first portable computer system and said second portable computer system.

4. The method as recited in claim 1 wherein said memory address is a physical memory location.

5. The method as recited in claim 1 wherein said multiple references each comprise an identification of a particular software component object and an identification of a particular function executed by said software component object.

6. The method as recited in claim 1 wherein said application is based on the COM (Component Object Model) software architecture.

7. A method of implementing an application in a client device, said method comprising:
  a) receiving said application at a host device;
  b) storing said application in computer-readable memory in said client device, said application having multiple references each to a respective section of computer code stored in an associated memory location in said client device, said multiple references each for transferring execution of said application to said respective section of computer code; and
  c) upon satisfying a specified criterion, said client device determining a memory address in said client device identifying said associated memory location for a respective section of computer code and repeating step c) for each of said multiple references, wherein said specified criterion is based on time elapsed since said application was transferred from said client device to another device;
  d) said client device replacing each reference of said multiple references with its associated memory address; and
  e) preventing each said respective section of computer code from being subsequently moved from its associated memory location and its associated memory address.

8. The method as recited in claim 7 wherein said client device is a portable computer system and said host device is a server computer system network.

9. The method as recited in claim 7 wherein said client device is a portable computer system and said host device is a desktop computer system.

10. The method a recited in claim 7 wherein said memory address is a physical memory location.

11. The method as recited in claim 7 wherein said multiple references each comprise an identification of a particular particular software component object and an identification of a particular function executed by said software component object.

12. A computer system comprising:
  a bus; and
  a processor coupled to said bus;
  said processor for performing a computer-implemented method for implementing an application in said computer system, said method comprising:
    a) receiving said application from an external source and storing said application in computer-readable memory of said computer system, said application having multiple references each to a respective section of computer code stored in an associated memory location in said computer system, said multiple references each for transferring execution of said application to said respective section of computer code;

b) after a specified criterion is satisfied, determining a memory address in said computer system identifying said associated memory location for a respective section of computer code and repeating step b) for each of said multiple references, wherein said specified criterion is based on a number of tames said application is transferred from said computer system to other devices;

c) said computer system replacing each reference of said multiple references with its associated memory address;

d) installing said application in said computer system; and e) preventing each said respective section of computer code from being subsequently moved from its associated memory location and its associated memory address.

13. The computer system of claim 12 wherein said computer system is a portable computer system.

14. The computer system of claim 12 wherein said memory address is is a physical memory location.

15. The computer system of claim 12 wherein said multiple references each comprise an identification of a particular software component object and an identification of a particular function executed by said software component object.

16. The computer system of claim 12 wherein said replacing comprises:

c1) inserting said computer system into a receiving slot of a cradle coupled to said external source; and c2) said computer system replacing each reference of said multiple references with its associated memory address in response to said inserting.

* * * * *